(12) United States Patent
Sugimoto et al.

(10) Patent No.: US 6,649,553 B2
(45) Date of Patent: Nov. 18, 2003

(54) DIELECTRIC CERAMIC COMPOSITION, DIELECTRIC CERAMIC COMPACT AND ELECTRONIC COMPONENT INCLUDING THE SAME

(75) Inventors: Yasutaka Sugimoto, Kyoto (JP); Tsutomu Tatekawa, Otsu (JP); Hitoshi Takagi, Omihachiman (JP)

(73) Assignee: Murata Manufacturing Co. Ltd. (JP)

( * ) Notice: Subject to any disclaimer, the term of this patent is extended or adjusted under 35 U.S.C. 154(b) by 74 days.

(21) Appl. No.: 10/097,370

(22) Filed: Mar. 15, 2002

(65) Prior Publication Data

US 2003/0069124 A1 Apr. 10, 2003

(30) Foreign Application Priority Data

Apr. 12, 2001 (JP) ........................................ 2001-114254

(51) Int. Cl.[7] ...................... C04B 35/465; C04B 35/468
(52) U.S. Cl. .................. 501/136; 361/321.4; 361/321.5; 327/551; 333/99 R; 333/219.1
(58) Field of Search ...................... 501/136; 361/321.5, 361/321.4; 327/551; 333/99 R, 219.1

(56) References Cited

U.S. PATENT DOCUMENTS 5,998,314 A * 12/1999 Sugimoto ..................... 501/32

6,143,680 A * 11/2000 Okawa ........................ 501/136
6,385,035 B1 * 5/2002 Matoba et al. ............ 361/321.1

FOREIGN PATENT DOCUMENTS

JP 61-256775 A1 11/1986
JP 2001-097770 A1 4/2001

* cited by examiner

*Primary Examiner*—David Brunsman
(74) *Attorney, Agent, or Firm*—Dickstein, Shapiro, Morin & Oshinsky, LLP.

(57) ABSTRACT

A dielectric ceramic composition for radiofrequency applications has a crystalline primary component having a perovskite crystal structure, and an auxiliary component. The crystalline primary component is represented by the formula:

$$(1-x)MeTi_aO_{1+2a}-xLn(Ma_{1/2}Mb_{1/2})_bO_{(3+3b)/2}$$

wherein Me is at least one of Ca and Sr; Ln is a rare earth element; Ma is at least one of Mg and Zn; Mb is at least one of Sn and Zr; x represents a mole fraction of $Ln(Ma_{1/2}Mb_{1/2})_bO_{(3+3b/2)}$; and a and b represent molar ratios, wherein $0.95 \leq a \leq 1.05$, $0.9 \leq b \leq 1.05$, and $0.3 \leq x \leq 0.5$. The auxiliary component includes B and Si. The composition can be sintered at 1,000° C. or less. An electronic component includes a ceramic element of the dielectric ceramic composition and conductors provided in the interior of the ceramic element.

20 Claims, 2 Drawing Sheets

DIELECTRIC CERAMIC COMPOSITION, DIELECTRIC CERAMIC COMPACT AND ELECTRONIC COMPONENT INCLUDING THE SAME

BACKGROUND OF THE INVENTION

1. Field of the Invention

The present invention relates to dielectric ceramic compositions and dielectric ceramic compacts for radiofrequency applications, for example, dielectric ceramic compacts having high Q values in radiofrequency ranges such as microwave and millimeter-wave ranges and particularly, a dielectric ceramic composition for radiofrequency applications which can be stacked and sintered together with metal electrodes. The present invention also relates to electric components such as a filter and duplexer including the dielectric ceramic compositions or dielectric ceramic compacts.

2. Description of the Related Art

In recent years, dielectric ceramic compacts provided by sintering dielectric ceramic compositions have been widely used in radiofrequency applications, such as filters, duplexers, dielectric resonators and dielectric substrates for monolithic integrated circuits (MICs).

In order to reduce the sizes of the above products, the dielectric ceramic compositions must satisfy the following requirements:

(1) A small dielectric constant;

(2) A small dielectric loss, in other words, a high Q value; and (3) A small dependence of the dielectric constant on temperature.

For example, Japanese Examined Patent Application Publication No. 4-59267 discloses a dielectric ceramic composition represented by the general formula $(Zr,Sn)TiO_4$. Though this ceramic composition exhibits generally satisfactory properties: ($\epsilon r$ is at least 38 and the Q value is at least 9,000), the composition must be fired at a high temperature of at least 1,350° C.

Use of inexpensive low-resistance metals such as Ag and Cu in internal electrode materials is required for dielectric resonators and the like in order to reduce material cost.

It is also required for simplifying the production process that the metals used in internal electrodes can be sintered together with dielectric ceramics. In order to achieve cosintering of the dielectric ceramic and the metal internal electrodes, firing must be performed at a temperature that is lower than the melting point of the metal.

The melting point of an electrode composed of Ag or Cu is generally in the range of about 960 to 1,100° C., which is significantly lower than firing temperatures of 1,300° C. or more applied in known firing processes for the dielectric ceramic compositions; hence, Ag and Cu cannot be used as the internal electrode materials.

The above-mentioned ceramic composition disclosed in Japanese Examined Patent Application Publication No. 4-59267 requires a high firing temperature of 1,350° C. or more; hence, the composition cannot be sintered with low-resistance metals such as Ag and Cu.

SUMMARY OF THE INVENTION

An object of the present invention is to provide a dielectric ceramic composition for radiofrequency applications which can be fired at a low temperature and be sintered with a low-resistance metal used in internal electrodes, and a dielectric ceramic compact which exhibits superior dielectric characteristics: a high dielectric constant and a high Q value.

Another object of the present invention is to provide electronic components such as a filter comprising the dielectric ceramic composition.

According to an aspect of the present invention, a dielectric ceramic composition for radiofrequency applications comprises a crystalline primary component having a perovskite crystal structure, and an auxiliary component. The crystalline primary component is represented by the formula:

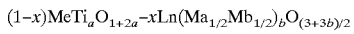
$$(1-x)MeTi_aO_{1+2a}-xLn(Ma_{1/2}Mb_{1/2})_bO_{(3+3b)/2}$$

wherein Me is at least one of Ca and Sr; Ln is a rare earth element; Ma is at least one of Mg and Zn; Mb is at least one of Sn and Zr; x represents a mole fraction of $Ln(Ma_{1/2}Mb_{1/2})_bO_{(3+3b/2)}$; and a and b represent molar ratios, wherein a, b, and x are, respectively, within the following ranges: $0.95 \leq a \leq 1.05$, $0.9 \leq b \leq 1.05$, and $0.3 \leq x \leq 0.5$. The auxiliary component comprises B and Si for decreasing the sintering temperature of the dielectric ceramic composition to about 1,000° C. or less.

The dielectric ceramic composition satisfying the above requirements has a low sintering temperature; thus, it can be sintered with a low-resistance metal used as internal electrodes.

Furthermore, the dielectric ceramic compact obtained by sintering the dielectric ceramic composition exhibits superior radiofrequency characteristics such as the Q value and dielectric characteristics; hence, electronic components such as a filter and a duplexer using this dielectric ceramic composition exhibit superior characteristics.

Preferably, the auxiliary component comprises: about 10 to 60 percent by weight of $SiO_2$; about 5 to 40 percent by weight of $B_2O_3$; 0 to about 30 percent by weight of $Al_2O_3$; about 20 to 70 percent by weight of EO; and 0 to about 15 percent by weight of $A_2O$, wherein E is at least one of Zn and alkaline earth metal elements selected from Mg, Ca, Sr and Ba, and A is at least one alkali metal element selected from Li, Na and K. This dielectric ceramic composition can be more readily sintered with the low-resistance metal. Thus, the dielectric ceramic composition exhibits superior dielectric characteristics, for example, a significantly high Q value.

Preferably, the auxiliary component is a glass comprising B and Si. By adding a predetermined proportion of the glass comprising B and Si, the dielectric ceramic composition exhibits further desired characteristics.

Preferably, the content of the primary component is 100 parts by weight and the content of the auxiliary component is in the range of about 1 to 40 parts by weight. The dielectric ceramic composition for radiofrequency applications thereby exhibits desired characteristics.

Preferably, the dielectric ceramic composition further comprises an additive. The additive is more than 0 up to about 5 parts by weight of CuO or more than 0 up to about 15 parts by weight of $TiO_2$, or both, with respect to 100 parts by weight of the primary component. The CuO additive within the above range improves sintering ability of the composition. The $TiO_2$ additive within the above range increases the Q value.

Preferably, the rare earth element is at least one selected from the group consisting of Y, La, Pr, Nd and Sm. These rare earth elements facilitate the formation of perovskite crystals composed of the primary component, resulting in a high Q value.

Preferably, in the above formula, Me is Ca and Ma is Mg. These elements facilitate the formation of the perovskite crystal composed of the primary component, resulting in a high Q value.

According to another aspect of the present invention, an electronic component comprises a ceramic element and conductors provided in the interior of the ceramic element. The ceramic element comprises the above-described dielectric ceramic compact. This electronic component exhibits satisfactory characteristics.

In this electronic component, the ceramic element may be formed by firing a composite of a plurality of green ceramic sheets comprising the dielectric ceramic composition.

Preferably, the conductors are formed by firing respective patterns of a conductive paste applied on the respective green ceramic sheets.

The dielectric ceramic composition according to the present invention can be sintered together with a low-resistance internal electrode material at a low sintering temperature. When this dielectric ceramic composition is used in, for example, a monolithic ceramic electronic component produced through a sintering step of a composite including green ceramic sheets provided with respective internal electrode patterns composed of a conductive paste, the internal conductors can be formed by simultaneously sintering the conductive paste and the green ceramic sheets at a low sintering temperature. Thus, the resulting monolithic ceramic electronic component exhibits superior characteristics.

Preferably, the conductors comprise Ag or Cu as the major component.

Preferably, the electronic component is a filter.

DESCRIPTION OF THE PREFERRED EMBODIMENT

Figure 1:
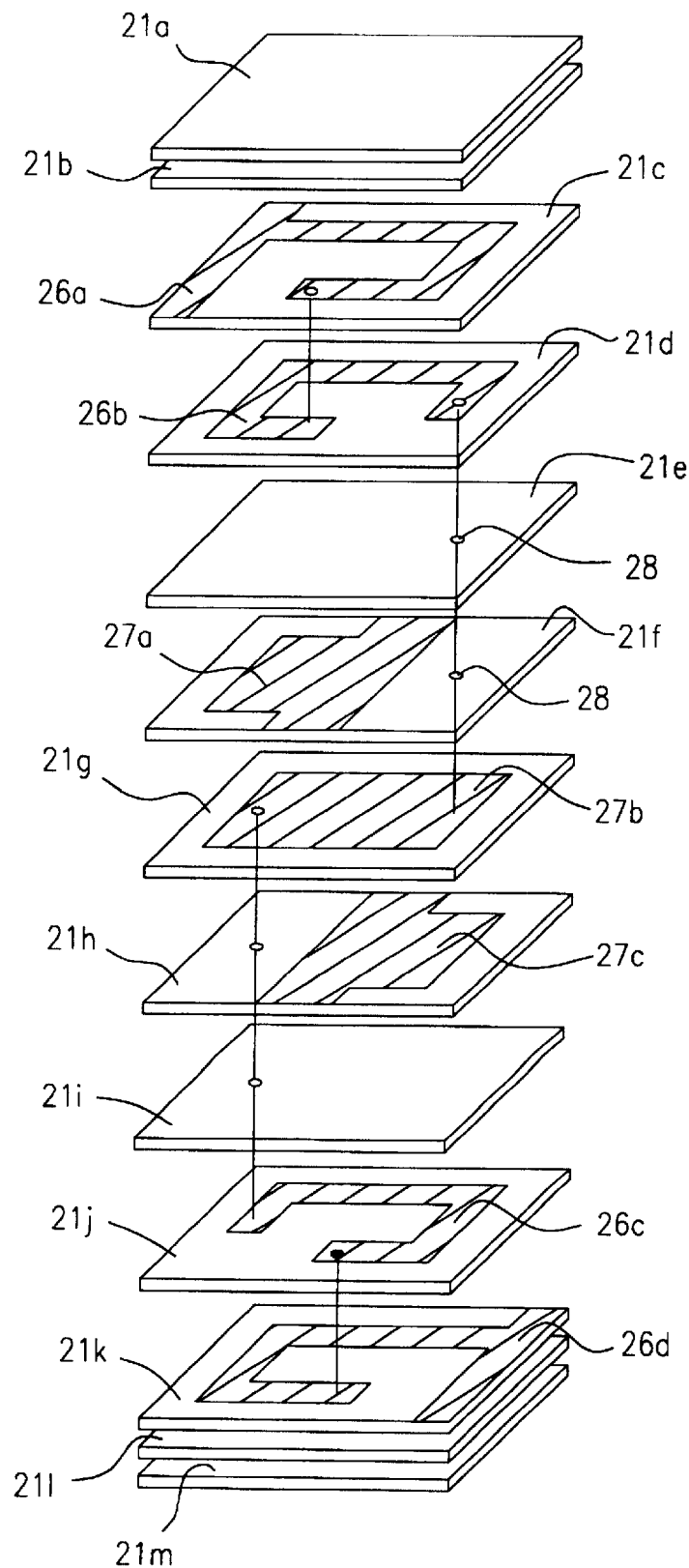
FIG. 1 is an exploded isometric view of an LC filter as an embodiment of a monolithic ceramic electronic component according to the present invention.

The dielectric ceramic composition for radiofrequency applications according to the present invention comprises a crystalline primary component having a perovskite crystal structure, and an auxiliary component. The crystalline primary component is represented by the formula:

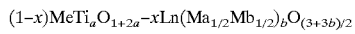

$(1-x)\text{MeTi}_a\text{O}_{1+2a} - x\text{Ln}(\text{Ma}_{1/2}\text{Mb}_{1/2})_b\text{O}_{(3+3b)/2}$ wherein Me is at least one of Ca and Sr; Ln is a rare earth element; Ma is at least one of Mg and Zn; Mb is at least one of Sn and Zr; x represents a mole fraction of $\text{Ln}(\text{Ma}_{1/2}\text{Mb}_{1/2})_b\text{O}_{(3+3b/2)}$; and a and b represent molar ratios, wherein a, b, and x are, respectively, within the following ranges: $0.95 \leq a \leq 1.05$, $0.9 \leq b \leq 1.05$, and $0.3 \leq x \leq 0.5$. The auxiliary component comprises B and Si for decreasing the sintering temperature of the dielectric ceramic composition to about 1,000° C. or less.

If a is outside of the range of 0.95 to 1.05, or if b is outside of the range of 0.9 to 1.05, the Q value is unsatisfactorily low. If x is less than 0.3, the temperature coefficient of the resonant frequency is undesirably large. If x exceeds 0.5, the temperature coefficient of the resonant frequency has a large negative value.

A dielectric ceramic composition satisfying the above requirements has a low sintering temperature; thus, it can be sintered with a low-resistance metal used as internal electrodes. Furthermore, the dielectric ceramic compact made of the dielectric ceramic composition exhibits superior radiofrequency characteristics, such as Q value and dielectric characteristics; hence, electronic components such as a filter and a duplexer using this dielectric ceramic composition exhibit superior characteristics.

Preferably, the auxiliary component comprises: about 10 to 60 percent by weight of $\text{SiO}_2$; about 5 to 40 percent by weight of $\text{B}_2\text{O}_3$; 0 to about 30 percent by weight of $\text{Al}_2\text{O}_3$; about 20 to 70 percent by weight of EO; and 0 to about 15 percent by weight of $\text{A}_2\text{O}$, wherein E is at least one of Zn and alkaline earth metal elements selected from Mg, Ca, Sr and Ba, and A is at least one alkali metal element selected from Li, Na and K.

At an $\text{SiO}_2$ content of less than about 10 percent by weight, the moisture resistance and the Q value decrease. At an $\text{SiO}_2$ content exceeding about 60%, the softening temperature of the auxiliary component such as glass is high, resulting in poor sintering ability, that is, the composition cannot be sintered at about 1,000° C. or less.

At a $\text{B}_2\text{O}_3$ content of less than about 5 percent by weight, the softening temperature of the auxiliary component such as glass is high, resulting in poor sintering ability. At a $\text{B}_2\text{O}_3$ content exceeding about 40 percent by weight, the moisture resistance decreases.

At an $\text{Al}_2\text{O}_3$ content exceeding about 30 percent by weight, the softening temperature of the auxiliary component such as glass is high, resulting in poor sintering ability.

Regarding the alkaline earth metal oxide and zinc oxide, at a content of less than about 20 percent by weight, the softening temperature of the auxiliary component such as glass is high, resulting in poor sintering ability. At a content exceeding about 70 percent by weight, the moisture resistance and the Q value decrease.

Though addition of alkali metal oxide to the auxiliary component such as glass is effective in decreasing the sintering temperature, the moisture resistance and the Q value decrease at an alkali metal oxide content exceeding about 15 percent by weight. Thus, the alkali oxide metal content is preferably in the range of 0 to about 15 percent by weight.

Preferably, the auxiliary component is a glass comprising B and Si. By adding a predetermined proportion of the glass comprising B and Si, the dielectric ceramic composition exhibits further desired characteristics.

Preferably, the content of the primary component is 100 parts by weight and the content of the auxiliary component is in the range of about 1 to 40 parts by weight. The dielectric ceramic composition for radiofrequency applications thereby exhibits desired characteristics.

Preferably, the dielectric ceramic composition further comprises an additive. The additive is 0 to about 5 parts by weight of CuO or 0 to about 15 parts by weight of $\text{TiO}_2$, or both, with respect to 100 parts by weight of the primary component. The CuO additive improves sintering ability of the composition, but the Q value decreases at a CuO content exceeding about 5 parts by weight. The $\text{TiO}_2$ additive increases the Q value, but the temperature coefficient of the resonant frequency is significantly large at a content exceeding about 15 parts by weight.

Preferably, the rare earth element is at least one selected from the group consisting of Y, La, Pr, Nd and Sm. These rare earth elements facilitate the formation of the perovskite crystals composed of the primary component, resulting in a high Q value.

Preferably, Me is Ca and Ma is Mg in the above formula. These elements facilitate the formation of the perovskite crystal composed of the primary component, resulting in a high Q value.

Using this dielectric ceramic composition for radiofrequency applications, electric components, such as filters and duplexers, having superior characteristics can be readily produced.

Figure 2:
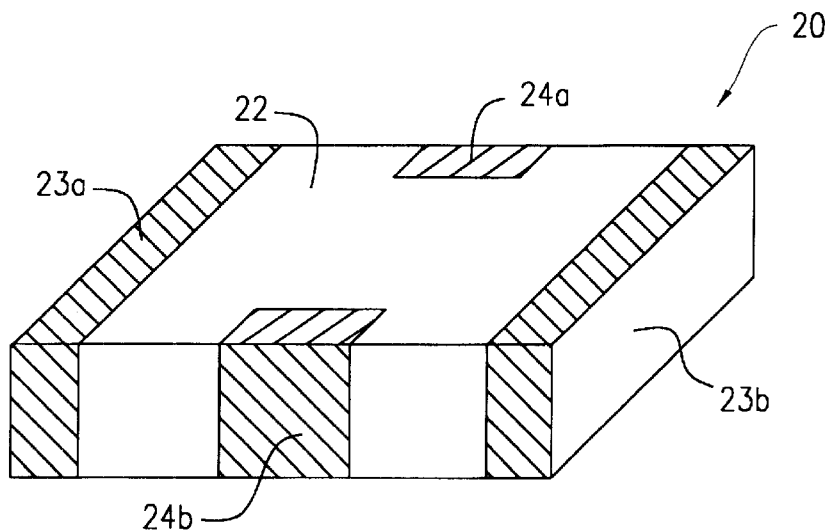
FIG. 2 is an isometric outside view of the LC filter shown in FIG. 1.
Figure 3:
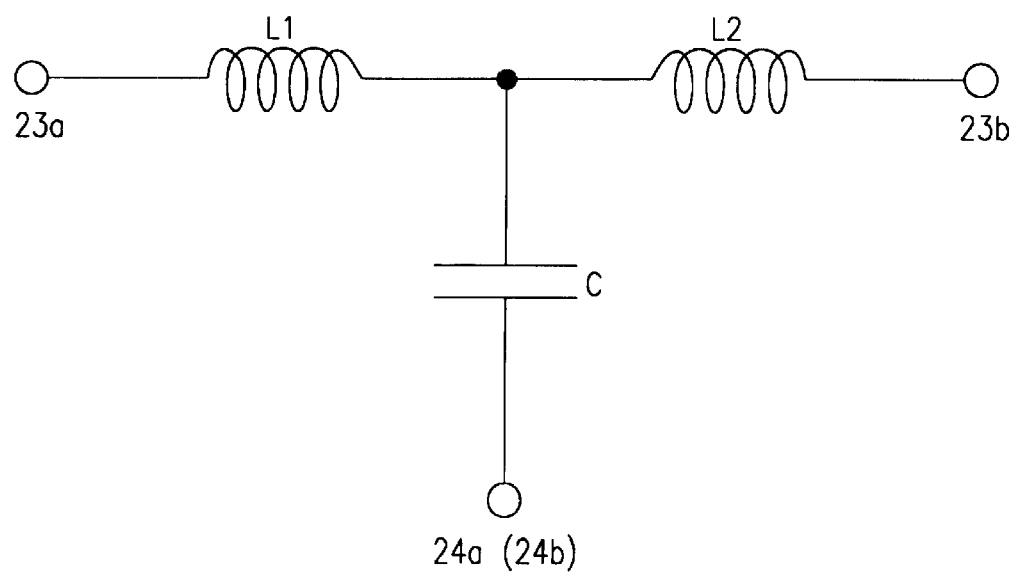
FIG. 3 is a circuit diagram of the LC filter shown in FIG. 1.

FIGS. 1, 2 and 3 are an exploded isometric view, an isometric outside view and a circuit diagram, respectively, of a monolithic ceramic electronic component according to an embodiment of the present invention.

This monolithic ceramic electronic component 20 in FIG. 2 is an LC filter. The monolithic ceramic electronic component 20 includes a sintered dielectric ceramic compact 21 having a circuit constituting inductors L and capacitors C therein, as described below. The sintered ceramic compact 21 of the monolithic ceramic electronic component 20 comprises the above-mentioned dielectric ceramic compact made of the dielectric ceramic composition for radiofrequency applications of the present invention. On outer faces of the sintered ceramic compact 21, external electrodes 23a, 23b, 24a and 24b are formed. An LC circuit shown in FIG. 3 is formed between the external electrodes 23a, 23b, 24a and 24b.

The configuration of the sintered ceramic compact 21 and a method for making the same will now be described with reference to FIG. 1.

An organic vehicle is added to the dielectric ceramic composition according to the present invention to prepare a ceramic slurry. This ceramic slurry is shaped into a green ceramic sheet by any known method such as a doctor blade process. The green ceramic sheet is dried and is punched out into a predetermined size to provide rectangular green ceramic sheets 21a to 21m.

Through holes for via holes are provided in predetermined green ceramic sheets among the green ceramic sheets 21a to 21m. A conductive paste is applied onto predetermined green ceramic sheets by screen printing to form coil conductors 26a and 26b, internal electrodes for capacitors 27a, 27b and 27c, and coil conductors 26c and 26d. The through holes are filled with the conductive paste to form via holes 28.

The green ceramic sheets 21a to 21m are stacked and the stack is compressed in the stacked direction to form a composite. The resulting composite is fired to form a sintered ceramic compact 21 shown in FIG. 2.

As shown in FIG. 2, external electrodes 23a, 23b, 24a and 24b are formed on the sintered ceramic compact 21 to prepare the monolithic ceramic electronic component 20. The external electrodes 23a, 23b, 24a and 24b may be formed by any process, for example, by a thick-film forming process including applying and baking a conductive paste, or a thin-film forming process such as evaporation, plating or sputtering.

In the monolithic ceramic electronic component (LC filter) 20, the coil conductors 26a and 26b of FIG. 1 constitute an inductor unit L1 in FIG. 3, the coil conductors 26c and 26d of FIG. 1 constitute another inductor unit L2 in FIG. 3, and the internal electrodes 27a, 27b, and 27c of FIG. 1 constitute capacitors C in FIG. 3.

In the monolithic ceramic electronic component (LC filter) 20 according to this embodiment, the sintered ceramic compact 21 is formed of the dielectric ceramic composition for radiofrequency applications of the present invention. Hence, the component can be sintered at a low temperature. When a low-melting point metal, for example, Ag or Cu is used in the coil conductors 26a, 26b, 26c and 26d and the internal electrodes 27a, 27b and 27c for capacitors, the metal can be fired together with the green ceramic sheets. Accordingly, the LC filter can be readily produced. The LC filter is suitable for radiofrequency applications requiring a high relative dielectric constant, a high Q value at radiofrequency, and a small temperature coefficient τf of the resonant frequency.

The dielectric ceramic composition for radiofrequency applications according to the present invention can be preferably applied to filters and duplexers, as described above. The dielectric ceramic composition can also be applied to dielectric resonators and dielectric substrates for MICs.

EXAMPLES

The present invention will now be described in further detail with reference to the following examples.

1. As starting materials, calcium carbonate ($CaCO_3$), strontium carbonate ($SrCO_3$), titanium oxide ($TiO_2$), rare earth oxides ($La_2O_3$ etc.), magnesium oxide (MgO), zinc oxide (ZnO) and tin oxide ($SnO_2$) are prepared.

2. These starting materials were formulated to prepare compositions having the following formula:

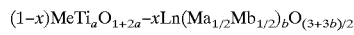

$(1-x)MeTi_aO_{1+2a}-xLn(Ma_{1/2}Mb_{1/2})_bO_{(3+3b)/2}$

Additionally, in Sample 39 (Table 4), Samples 66 to 70 (Table 7), Sample 113 (Table 12), Sample 140 (Table 14), and Samples 141 to 144 (Table 15), a CuO or $TiO_2$ additive was added to formulate raw materials containing the additive.

3. The formulated powders were mixed by a wet process in a ball mill for 16 hours, dehydrated, dried and calcined at 1,100° C. to 1,300° C. for 3 hours. The calcined powdered were pulverized in a ball mill until the particle size became less than 1 μm.

4. Meanwhile, $BaCO_3$, $SrCO_3$, $CaCO_3$, $MgCO_3$, ZnO, $Al_2O_3$, $Li_2CO_3$, $Na_2CO_3$, $K_2CO_3$, $SiO_2$ and $B_2O_3$ were formulated according to the compositions shown in Table 16. The formulated mixtures were each placed into a PtRh crucible and melted at 1,200° C. to 1,600° C. Each melt was quenched and pulverized to form a glass material (powdered glass) as an auxiliary component. It should be noted that the composition represented by G26 in Table 16 could not be formed into glass material.

5. Each formulated powder was mixed to form a dielectric ceramic composition, and was compacted under a pressure of 1,000 kgf/cm² into a disk so as to have a diameter of 10 mm and a thickness of 5 mm after firing, and the disk was fired at 900° C. to 1,200° C. for 2 hours to form a dielectric ceramic compact.

6. The relative dielectric constant (εr) and the Q value at the resonant frequency (about 1 GHz) of each dielectric ceramic compact were measured by a dielectric resonator method (short-circuited at both ends of a dielectric resonator).

The results are also shown in Tables 1 to 15. In Tables 1 to 15, asterisked samples represent outside of the present invention, and the others represent within the present invention.

Tables 1 to 15 show that the dielectric ceramic compacts according to the present invention have relatively high Q values of 10,000 or more and relative dielectric constants of about 25 or more at about 1 GHz.

Tables 1 to 15 also show that the dielectric ceramic compositions according to the present invention can be sintered at low temperatures of about 1,000° C. or less.

The dielectric ceramic compositions according to the present invention can be sintered with an inexpensive metal having low resistance such as Ag or Cu as the internal electrode, and the size of a radiofrequency resonator can be reduced by stacking sheets composed of the dielectric ceramic composition.

Furthermore, electronic components, such as LC filters and duplexers produced using these dielectric ceramic compositions have satisfactory characteristics. Electronic devices such as communication apparatuses using these electronic components also have satisfactory characteristics.

While the invention has been particularly shown and described with reference to preferred embodiments and examples thereof, it will be understood by those skilled in the art that the foregoing and other changes in form and details can be made therein without departing from the spirit and the scope of the invention.

TABLE 1

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 1* | Ca | Mg | La | Sn | 1.00 | 1.00 | 0.25 | — | G1 | 10 | 900 | 46.3 | 9.2 | 51 |
| 2 | Ca | 0.8 Mg 0.2 Zn | La | Sn | 1.00 | 1.00 | 0.30 | — | G1 | 10 | 900 | 43.4 | 10.0 | 27 |
| 3 | Ca | Mg | La | Sn | 1.00 | 1.00 | 0.30 | — | G1 | 10 | 900 | 42.6 | 11.8 | 33 |
| 4* | Ca | Mg | La | Sn | 0.90 | 1.00 | 0.35 | — | G1 | 10 | 900 | 38.6 | 6.2 | 8 |
| 5 | Ca | Mg | La | Sn | 0.95 | 1.00 | 0.35 | — | G1 | 10 | 900 | 38.9 | 14.3 | 7 |
| 6* | Ca | Mg | La | Sn | 1.00 | 0.85 | 0.35 | — | G1 | 10 | 900 | 38.9 | 6.1 | 9 |
| 7 | Ca | Mg | La | Sn | 1.00 | 0.90 | 0.35 | — | G1 | 10 | 900 | 38.8 | 16.8 | 8 |
| 8 | Ca | Mg | La | Sn | 1.00 | 1.00 | 0.35 | — | G1 | 10 | 900 | 38.9 | 16.9 | 7 |
| 9 | Ca | Mg | La | Sn | 1.00 | 1.05 | 0.35 | — | G1 | 10 | 900 | 38.7 | 15.8 | 8 |
| 10* | Ca | Mg | La | Sn | 1.00 | 1.10 | 0.35 | — | G1 | 10 | 900 | 38.8 | 5.9 | 7 |

TABLE 2

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 11 | Ca | Mg | La | Sn | 1.05 | 1.00 | 0.35 | — | G1 | 10 | 900 | 38.9 | 10.3 | 7 |
| 12* | Ca | Mg | La | Sn | 1.10 | 1.00 | 0.35 | — | G1 | 10 | 900 | 38.8 | 3.9 | 9 |
| 13 | Ca | 0.8 Mg 0.2 Zn | La | Sn | 1.00 | 1.00 | 0.40 | — | G1 | 10 | 900 | 35.7 | 19.9 | −20 |
| 14 | Ca | Mg | La | Sn | 1.00 | 1.00 | 0.40 | — | G1 | 10 | 900 | 35.1 | 23.9 | −17 |
| 15 | Ca | Mg | La | Sn | 1.00 | 1.00 | 0.45 | — | G1 | 10 | 900 | 32.2 | 21.0 | −35 |
| 16 | Ca | Mg | La | Sn | 1.00 | 1.00 | 0.50 | — | G1 | 10 | 900 | 27.2 | 21.6 | −50 |
| 17* | Ca | Mg | La | Sn | 1.00 | 1.00 | 0.55 | — | G1 | 10 | 900 | 23.0 | 22.2 | −70 |
| 18* | 0.8 Ca 0.2 Sr | Mg | La | Sn | 0.90 | 1.00 | 0.35 | — | G1 | 10 | 900 | 36.5 | 5.6 | 10 |
| 19 | 0.8 Ca 0.2 Sr | Mg | La | Sn | 0.95 | 1.00 | 0.35 | — | G1 | 10 | 900 | 36.3 | 11.0 | 8 |
| 20* | 0.8 Ca 0.2 Sr | Mg | La | Sn | 1.00 | 0.85 | 0.35 | — | G1 | 10 | 900 | 36.1 | 7.3 | 9 |

TABLE 3

| Sample | Me | Ma | Ln | Mb | a | b | X | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 21 | 0.8 Ca 0.2 Sr | Mg | La | Sn | 1.00 | 0.90 | 0.35 | — | G1 | 10 | 900 | 36.3 | 13.7 | 11 |
| 22 | 0.8 Ca 0.2 Sr | Mg | La | Sn | 1.00 | 1.00 | 0.35 | — | G1 | 10 | 900 | 36.5 | 14.2 | 11 |
| 23 | 0.8 Ca 0.2 Sr | Mg | La | Sn | 1.00 | 1.05 | 0.35 | — | G1 | 10 | 900 | 36.2 | 12.8 | 10 |
| 24* | 0.8 Ca 0.2 Sr | Mg | La | Sn | 1.00 | 1.10 | 0.35 | — | G1 | 10 | 900 | 36.3 | 6.6 | 9 |
| 25 | 0.8 Ca 0.2 Sr | Mg | La | Sn | 1.00 | 1.05 | 0.35 | — | G1 | 10 | 900 | 36.1 | 12.4 | 10 |
| 26* | 0.8 Ca 0.2 Sr | Mg | La | Sn | 1.00 | 1.10 | 0.35 | — | G1 | 10 | 900 | 36.2 | 4.5 | 8 |
| 27 | Ca | Mg | Y | Sn | 1.00 | 1.00 | 0.35 | — | G1 | 10 | 900 | 37.2 | 16.7 | 6 |

TABLE 3-continued

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 28 | Ca | Mg | 0.1 Y 0.9 La | Sn | 1.00 | 1.00 | 0.35 | — | G1 | 10 | 900 | 38.6 | 16.7 | 7 |
| 29 | Ca | Mg | 0.3 Y 0.7 La | Sn | 1.00 | 1.00 | 0.35 | — | G1 | 10 | 900 | 38.1 | 16.7 | 7 |
| 30 | Ca | Mg | Pr | Sn | 1.00 | 1.00 | 0.35 | — | G1 | 10 | 900 | 38.6 | 17.0 | 8 |

TABLE 4

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 31 | Ca | Mg | 0.1 Pr 0.9 La | Sn | 1.00 | 1.00 | 0.35 | — | G1 | 10 | 900 | 38.8 | 10.9 | 9 |
| 32 | Ca | Mg | 0.3 Pr 0.7 La | Sn | 1.00 | 1.00 | 0.35 | — | G1 | 10 | 900 | 38.4 | 17.0 | 8 |
| 33 | Ca | Mg | Nd | Sn | 1.00 | 1.00 | 0.35 | — | G1 | 10 | 900 | 38.3 | 17.5 | 8 |
| 34 | Ca | Mg | 0.1 Nd 0.9 La | Sn | 1.00 | 1.00 | 0.35 | — | G1 | 10 | 900 | 38.5 | 16.6 | 9 |
| 35 | Ca | Mg | 0.3 Nd 0.7 La | Sn | 1.00 | 1.00 | 0.35 | — | G1 | 10 | 900 | 37.9 | 16.9 | 8 |
| 36 | Ca | Mg | Sm | Sn | 1.00 | 1.00 | 0.35 | — | G1 | 10 | 900 | 37.2 | 17.6 | 11 |
| 37 | Ca | Mg | 0.1 Sm 0.9 La | Sn | 1.00 | 1.00 | 0.35 | — | G1 | 10 | 900 | 38.3 | 17.0 | 10 |
| 38 | Ca | Mg | 0.3 Sm 0.7 La | Sn | 1.00 | 1.00 | 0.35 | — | G1 | 10 | 900 | 37.9 | 17.2 | 9 |
| 39 | Ca | Mg | La | Sn | 1.00 | 1.00 | 0.35 | $TiO_2$ | G1 | 10 | 900 | 39.0 | 18.5 | 14 |
| 40 | Ca | Mg | La | Sn | 1.00 | 1.00 | 0.35 | — | G2 | 10 | 900 | 37.9 | 18.0 | 9 |

TABLE 5

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 41* | Ca | Mg | La | Sn | 1.00 | 1.00 | 0.35 | — | G3 | 10 | 900 | 37.8 | 18.1 | 11 |
| 42 | Ca | Mg | La | Sn | 1.00 | 1.00 | 0.35 | — | G4 | 10 | 900 | 37.9 | 18.2 | 4 |
| 43* | Ca | Mg | La | Sn | 1.00 | 1.00 | 0.35 | — | G5 | 10 | 900 | 38.4 | 18.1 | 4 |
| 44* | Ca | Mg | La | Sn | 1.00 | 1.00 | 0.35 | — | G6 | 10 | 900 | 37.8 | 16.0 | −1 |
| 45 | Ca | Mg | La | Sn | 1.00 | 1.00 | 0.35 | — | G7 | 10 | 900 | 39.5 | 14.0 | −6 |
| 46 | Ca | Mg | La | Sn | 1.00 | 1.00 | 0.35 | — | G8 | 10 | 900 | 38.5 | 16.0 | 3 |
| 47* | Ca | Mg | La | Sn | 1.00 | 1.00 | 0.35 | — | G9 | 10 | 900 | 38.4 | 12.0 | 6 |
| 48 | Ca | Mg | La | Sn | 1.00 | 1.00 | 0.35 | — | G10 | 10 | 900 | 38.8 | 16.0 | 6 |
| 49 | Ca | Mg | La | Sn | 1.00 | 1.00 | 0.35 | — | G11 | 10 | 900 | 38.8 | 15.5 | 5 |
| 50 | Ca | Mg | La | Sn | 1.00 | 1.00 | 0.35 | — | G12 | 10 | 900 | 39.5 | 17.0 | 2 |

TABLE 6

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 51* | Ca | Mg | La | Sn | 1.00 | 1.00 | 0.35 | — | G13 | 10 | 900 | 38.8 | 16.5 | 9 |
| 52 | Ca | Mg | La | Sn | 1.00 | 1.00 | 0.35 | — | G14 | 10 | 900 | 40.1 | 11.1 | 13 |
| 53 | Ca | Mg | La | Sn | 1.00 | 1.00 | 0.35 | — | G15 | 10 | 900 | 39.4 | 12.4 | 7 |
| 54 | Ca | Mg | La | Sn | 1.00 | 1.00 | 0.35 | — | G16 | 10 | 900 | 39.2 | 15.2 | 9 |
| 55 | Ca | Mg | La | Sn | 1.00 | 1.00 | 0.35 | — | G17 | 10 | 900 | 38.9 | 15.9 | 7 |
| 56 | Ca | Mg | La | Sn | 1.00 | 1.00 | 0.35 | — | G18 | 10 | 900 | 36.9 | 13.9 | 2 |
| 57* | Ca | Mg | La | Sn | 1.00 | 1.00 | 0.35 | — | G19 | 10 | 900 | 35.8 | 13.0 | −1 |

TABLE 6-continued

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 58 | Ca | Mg | La | Sn | 1.00 | 1.00 | 0.35 | — | G20 | 10 | 900 | 39.7 | 15.2 | −2 |
| 59 | Ca | Mg | La | Sn | 1.00 | 1.00 | 0.35 | — | G21 | 10 | 900 | 39.0 | 15.5 | 2 |
| 60 | Ca | Mg | La | Sn | 1.00 | 1.00 | 0.35 | — | G22 | 10 | 900 | 37.5 | 15.3 | 4 |

TABLE 7

| Sample | Me | Ma | Ln | Mb | a | b | x | Auxiliary | Auxiliary Content (wt %) | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|---|
| 61 | Ca | Mg | La | Sn | 1.00 | 1.00 | 0.35 | — | — | G23 | 10 | 900 | 37.5 | 16.2 | 6 |
| 62* | Ca | Mg | La | Sn | 1.00 | 1.00 | 0.35 | — | — | G14 | 0.5 | 1000 | ** | ** | ** |
| 63 | Ca | Mg | La | Sn | 1.00 | 1.00 | 0.35 | — | — | G14 | 1 | 1000 | 45.0 | 22.0 | 10 |
| 64 | Ca | Mg | La | Sn | 1.00 | 1.00 | 0.35 | — | — | G12 | 40 | 900 | 30.2 | 10.0 | −10 |
| 65* | Ca | Mg | La | Sn | 1.00 | 1.00 | 0.35 | — | — | G12 | 50 | 900 | 26.8 | 6.2 | −15 |
| 66 | Ca | Mg | La | Sn | 1.00 | 1.00 | 0.35 | TiO$_2$ | 15 | G1 | 10 | 900 | 42.0 | 15.0 | 35 |
| 67* | Ca | Mg | La | Sn | 1.00 | 1.00 | 0.35 | TiO$_2$ | 20 | G1 | 10 | 900 | 45.0 | 14.0 | 55 |
| 68 | Ca | Mg | La | Sn | 1.00 | 1.00 | 0.35 | CuO | 5 | G1 | 10 | 900 | 40.2 | 10.1 | −15 |
| 69* | Ca | Mg | La | Sn | 1.00 | 1.00 | 0.35 | CuO | 10 | G1 | 10 | 900 | 43.0 | 2.0 | −30 |
| 70 | Ca | Mg | La | Sn | 1.00 | 1.00 | 0.35 | CuO | 1 | G1 | 10 | 900 | 39.9 | 15.0 | 7 |

**Unsinterable

TABLE 8

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 71* | Ca | Mg | La | Zr | 1.00 | 1.00 | 0.275 | — | G1 | 10 | 900 | 51.5 | 8.8 | 50 |
| 72 | Ca | 0.8 Mg 0.2 Zn | La | Zr | 1.00 | 1.00 | 0.30 | — | G1 | 10 | 900 | 49.5 | 11.3 | 36 |
| 73 | Ca | Mg | La | Zr | 1.00 | 1.00 | 0.30 | — | G1 | 10 | 900 | 48.9 | 12.6 | 40 |
| 74 | Ca | Mg | La | Zr | 1.00 | 1.00 | 0.325 | — | G1 | 10 | 900 | 46.8 | 14.8 | 30 |
| 75 | Ca | Mg | La | Zr | 1.00 | 1.00 | 0.35 | — | G1 | 10 | 900 | 44.4 | 16.6 | 24 |
| 76 | Ca | Mg | La | Zr | 1.00 | 1.00 | 0.375 | — | G1 | 10 | 900 | 42.0 | 17.0 | 9 |
| 77* | Ca | Mg | La | Zr | 0.90 | 1.00 | 0.40 | — | G1 | 10 | 900 | 40.3 | 7.3 | −2 |
| 78 | Ca | Mg | La | Zr | 0.95 | 1.00 | 0.40 | — | G1 | 10 | 900 | 40.4 | 16.1 | −2 |
| 79* | Ca | Mg | La | Zr | 1.00 | 0.85 | 0.40 | — | G1 | 10 | 900 | 40.3 | 8.6 | −3 |
| 80 | Ca | Mg | La | Zr | 1.00 | 0.90 | 0.40 | — | G1 | 10 | 900 | 40.3 | 18.1 | −1 |

TABLE 9

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 81 | Ca | Mg | La | Zr | 1.00 | 1.00 | 0.40 | — | G1 | 10 | 900 | 40.4 | 17.8 | −2 |
| 82 | Ca | Mg | La | Zr | 1.00 | 1.05 | 0.40 | — | G1 | 10 | 900 | 40.2 | 16.6 | −1 |
| 83* | Ca | Mg | La | Zr | 1.00 | 1.10 | 0.40 | — | G1 | 10 | 900 | 40.3 | 7.0 | −3 |
| 84 | Ca | Mg | La | Zr | 1.05 | 1.00 | 0.40 | — | G1 | 10 | 900 | 40.3 | 13.6 | −2 |
| 85* | Ca | Mg | La | Zr | 1.10 | 1.00 | 0.40 | — | G1 | 10 | 900 | 40.2 | 5.9 | −1 |
| 86 | Ca | Mg | La | Zr | 1.00 | 1.00 | 0.425 | — | G1 | 10 | 900 | 38.1 | 18.5 | −18 |
| 87 | Ca | 0.8 Mg 0.2 Zn | La | Zr | 1.00 | 1.00 | 0.425 | — | G1 | 10 | 900 | 38.8 | 16.3 | −20 |
| 88 | Ca | Mg | La | Zr | 1.00 | 1.00 | 0.45 | — | G1 | 10 | 900 | 36.5 | 19.0 | −30 |
| 89 | Ca | Mg | La | Zr | 1.00 | 1.00 | 0.475 | — | G1 | 10 | 900 | 35.0 | 19.8 | −31 |
| 90 | Ca | Mg | La | Zr | 1.00 | 1.00 | 0.50 | — | G1 | 10 | 900 | 32.8 | 20.9 | −50 |

TABLE 10

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 91* | Ca | Mg | La | Zr | 1.00 | 1.00 | 0.55 | — | G1 | 10 | 900 | 30.9 | 21.3 | −65 |
| 92* | 0.8 Ca 0.2 Sr | Mg | La | Zr | 0.90 | 1.00 | 0.40 | — | G1 | 10 | 900 | 38.2 | 7.2 | 0 |
| 93 | 0.8 Ca 0.2 Sr | Mg | La | Zr | 0.95 | 1.00 | 0.40 | — | G1 | 10 | 900 | 38.3 | 11.8 | 0 |
| 94* | 0.8 Ca 0.2 Sr | Mg | La | Zr | 1.00 | 0.85 | 0.40 | — | G1 | 10 | 900 | 38.2 | 4.6 | 1 |
| 95 | 0.8 Ca 0.2 Sr | Mg | La | Zr | 1.00 | 0.90 | 0.40 | — | G1 | 10 | 900 | 38.2 | 12.8 | 0 |
| 96 | 0.8 Ca 0.2 Sr | Mg | La | Zr | 1.00 | 1.00 | 0.40 | — | G1 | 10 | 900 | 38.3 | 14.3 | 1 |
| 97 | 0.8 Ca 0.2 Sr | Mg | La | Zr | 1.00 | 1.05 | 0.40 | — | G1 | 10 | 900 | 38.3 | 13.4 | 0 |
| 98* | 0.8 Ca 0.2 Sr | Mg | La | Zr | 1.00 | 1.10 | 0.40 | — | G1 | 10 | 900 | 38.2 | 6.4 | 1 |
| 99 | 0.8 Ca 0.2 Sr | Mg | La | Zr | 1.05 | 1.00 | 0.40 | — | G1 | 10 | 900 | 38.3 | 10.2 | 1 |
| 100* | 0.8 Ca 0.2 Sr | Mg | La | Zr | 1.10 | 1.00 | 0.40 | — | G1 | 10 | 900 | 38.2 | 4.3 | 2 |

TABLE 11

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 101 | Ca | Mg | Y | Zr | 1.00 | 1.00 | 0.40 | — | G1 | 10 | 900 | 39.4 | 17.2 | −2 |
| 102 | Ca | Mg | 0.1 Y 0.9 La | Zr | 1.00 | 1.00 | 0.40 | — | G1 | 10 | 900 | 39.4 | 17.0 | −2 |
| 103 | Ca | Mg | 0.3 Y 0.7 La | Zr | 1.00 | 1.00 | 0.40 | — | G1 | 10 | 900 | 40.2 | 16.7 | −3 |
| 104 | Ca | Mg | Pr | Zr | 1.00 | 1.00 | 0.40 | — | G1 | 10 | 900 | 39.8 | 17.3 | −2 |
| 105 | Ca | Mg | 0.1 Pr 0.9 La | Zr | 1.00 | 1.00 | 0.40 | — | G1 | 10 | 900 | 40.2 | 17.2 | −1 |
| 106 | Ca | Mg | 0.3 Pr 0.7 La | Zr | 1.00 | 1.00 | 0.40 | — | G1 | 10 | 900 | 39.9 | 17.0 | −2 |
| 107 | Ca | Mg | Nd | Zr | 1.00 | 1.00 | 0.40 | — | G1 | 10 | 900 | 39.6 | 18.1 | −3 |
| 108 | Ca | Mg | 0.1 Nd 0.9 La | Zr | 1.00 | 1.00 | 0.40 | — | G1 | 10 | 900 | 40.1 | 17.8 | −2 |
| 109 | Ca | Mg | 0.3 Nd 0.7 La | Zr | 1.00 | 1.00 | 0.40 | — | G1 | 10 | 900 | 40.2 | 17.7 | −2 |
| 110 | Ca | Mg | Sm | Zr | 1.00 | 1.00 | 0.40 | — | G1 | 10 | 900 | 38.9 | 17.3 | 1 |

TABLE 12

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 111 | Ca | Mg | 0.1 Sm 0.9 La | Zr | 1.00 | 1.00 | 0.40 | — | G1 | 10 | 900 | 39.9 | 17.2 | 0 |
| 112 | Ca | Mg | 0.3 Sm 0.7 La | Zr | 1.00 | 1.00 | 0.40 | — | G1 | 10 | 900 | 39.5 | 17.0 | 0 |
| 113 | Ca | Mg | La | Zr | 1.00 | 1.00 | 0.40 | $TiO_2$ (5 wt. %) | G1 | 10 | 900 | 41.0 | 19.0 | 3 |
| 114 | Ca | Mg | La | Zr | 1.00 | 1.00 | 0.40 | — | G2 | 10 | 900 | 39.5 | 18.0 | 0 |
| 115* | Ca | Mg | La | Zr | 1.00 | 1.00 | 0.40 | — | G3 | 10 | 900 | 39.5 | 19.8 | 2 |
| 116 | Ca | Mg | La | Zr | 1.00 | 1.00 | 0.40 | — | G4 | 10 | 900 | 39.4 | 21.1 | −5 |
| 117* | Ca | Mg | La | Zr | 1.00 | 1.00 | 0.40 | — | G5 | 10 | 900 | 40.1 | 20.0 | −5 |
| 118* | Ca | Mg | La | Zr | 1.00 | 1.00 | 0.40 | — | G6 | 10 | 900 | 39.8 | 16.8 | −10 |

TABLE 12-continued

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 119 | Ca | Mg | La | Zr | 1.00 | 1.00 | 0.40 | — | G7 | 10 | 900 | 41.0 | 13.5 | −15 |
| 120 | Ca | Mg | La | Zr | 1.00 | 1.00 | 0.40 | — | G8 | 10 | 900 | 40.5 | 17.0 | −5 |

TABLE 13

| Sample | Me | Ma | Ln | Mb | a | b | x | Type of Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 121* | Ca | Mg | La | Zr | 1.00 | 1.00 | 0.40 | — | G9 | 10 | 900 | 40.4 | 12.0 | −3 |
| 122 | Ca | Mg | La | Zr | 1.00 | 1.00 | 0.40 | — | G10 | 10 | 900 | 40.5 | 17.2 | −3 |
| 123 | Ca | Mg | La | Zr | 1.00 | 1.00 | 0.40 | — | G11 | 10 | 900 | 40.3 | 16.8 | −4 |
| 124 | Ca | Mg | La | Zr | 1.00 | 1.00 | 0.40 | — | G12 | 10 | 900 | 41.2 | 18.0 | −7 |
| 125* | Ca | Mg | La | Zr | 1.00 | 1.00 | 0.40 | — | G13 | 10 | 900 | 40.5 | 17.1 | 0 |
| 126 | Ca | Mg | La | Zr | 1.00 | 1.00 | 0.40 | — | G14 | 10 | 900 | 41.6 | 12.0 | 4 |
| 127 | Ca | Mg | La | Zr | 1.00 | 1.00 | 0.40 | — | G15 | 10 | 900 | 40.4 | 13.5 | −2 |
| 128 | Ca | Mg | La | Zr | 1.00 | 1.00 | 0.40 | — | G16 | 10 | 900 | 40.4 | 15.6 | 0 |
| 129 | Ca | Mg | La | Zr | 1.00 | 1.00 | 0.40 | — | G17 | 10 | 900 | 39.9 | 16.5 | −2 |
| 130 | Ca | Mg | La | Zr | 1.00 | 1.00 | 0.40 | — | G18 | 10 | 900 | 38.5 | 14.8 | −7 |

TABLE 14

| Sample | Me | Ma | Ln | Mb | a | b | x | Auxiliary Component | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|
| 131* | Ca | Mg | La | Zr | 1.00 | 1.00 | 0.40 | — | G19 | 10 | 900 | 38.0 | 14.3 | −10 |
| 132 | Ca | Mg | La | Zr | 1.00 | 1.00 | 0.40 | — | G20 | 10 | 900 | 41.0 | 16.0 | −10 |
| 133 | Ca | Mg | La | Zr | 1.00 | 1.00 | 0.40 | — | G21 | 10 | 900 | 40.3 | 17.0 | −7 |
| 134 | Ca | Mg | La | Zr | 1.00 | 1.00 | 0.40 | — | G22 | 10 | 900 | 40.0 | 16.2 | −5 |
| 135 | Ca | Mg | La | Zr | 1.00 | 1.00 | 0.40 | — | G23 | 10 | 900 | 39.9 | 17.8 | −2 |
| 136* | Ca | Mg | La | Zr | 1.00 | 1.00 | 0.40 | — | G14 | 0.5 | 1000 | ** | ** | ** |
| 137 | Ca | Mg | La | Zr | 1.00 | 1.00 | 0.40 | — | G14 | 1 | 1000 | 47.0 | 23.1 | 2 |
| 138 | Ca | Mg | La | Zr | 1.00 | 1.00 | 0.40 | — | G12 | 40 | 900 | 31.1 | 10.1 | −18 |
| 139* | Ca | Mg | La | Zr | 1.00 | 1.00 | 0.40 | — | G12 | 50 | 900 | 27.0 | 5.8 | −25 |
| 140 | Ca | Mg | La | Zr | 1.00 | 1.00 | 0.40 | TiO$_2$ (15 w %) | G1 | 10 | 900 | 42.5 | 19.0 | 30 |

**Unsinterable

TABLE 15

| Sample | Me | Ma | Ln | Mb | a | b | x | Type of Auxiliary Component | Auxiliary Component Content (wt %) | Type of Glass | Glass Content (wt %) | Sintering Temp. (° C.) | Relative Dielectric Constant | Q Value × 1000 1 GHz | τf (ppm/° C.) |
|---|---|---|---|---|---|---|---|---|---|---|---|---|---|---|---|
| 141* | Ca | Mg | La | Zr | 1.00 | 1.00 | 0.40 | TiO$_2$ | 20 | G1 | 10 | 900 | 43.2 | 18.5 | 55 |
| 142 | Ca | Mg | La | Zr | 1.00 | 1.00 | 0.40 | CuO | 5 | G1 | 10 | 900 | 41.2 | 10.5 | −20 |
| 143* | Ca | Mg | La | Zr | 1.00 | 1.00 | 0.40 | CuO | 10 | G1 | 10 | 900 | 44.0 | 2.4 | −30 |
| 144 | Ca | Mg | La | Zr | 1.00 | 1.00 | 0.40 | CuO | 1 | G1 | 10 | 900 | 41.8 | 18.9 | 0 |
| 145 | Ca | Mg | La | Zr | 1.00 | 1.00 | 0.40 | — | — | G24 | 10 | 900 | 35.0 | 23.0 | −16 |
| 146 | Ca | Mg | La | Zr | 1.00 | 1.00 | 0.40 | — | — | G25 | 15 | 900 | 30.0 | 15.0 | −20 |

TABLE 16

|  | SiO$_2$ | B$_2$O$_3$ | K$_2$O | Li$_2$O | Na$_2$O | BaO | SrO | MgO | CaO | ZnO | Al$_2$O$_3$ |
|---|---|---|---|---|---|---|---|---|---|---|---|
| G1 | 25 | 30 | — | 10 | — | — | — | — | — | 35 | — |
| G2 | 10 | 40 | — | 10 | — | — | — | — | — | 40 | — |
| G3* | 5 | 40 | — | 10 | — | — | — | — | — | 45 | — |
| G4 | 50 | 20 | — | 10 | — | — | — | — | — | 20 | — |
| G5* | 70 | 10 | — | 10 | — | — | — | — | — | 10 | — |
| G6* | 50 | 2 | — | 15 | — | — | — | — | — | 33 | — |
| G7 | 40 | 5 | — | 15 | — | 20 | — | — | — | 20 | — |
| G8 | 20 | 50 | — | 10 | — | — | — | — | — | 20 | — |
| G9* | 10 | 70 | — | 10 | — | 5 | — | — | — | 10 | — |
| G10 | 25 | 30 | 10 | — | — | — | — | — | — | 35 | — |
| G11 | 25 | 30 | — | — | 10 | — | — | — | — | 35 | — |
| G12 | 25 | 40 | — | — | — | — | — | — | — | 35 | — |
| G13* | 15 | 30 | — | 20 | — | — | — | — | — | 35 | — |
| G14 | 25 | 35 | — | 10 | — | 30 | — | — | — | — | — |
| G15 | 25 | 35 | — | 10 | — | — | 30 | — | — | — | — |
| G16 | 25 | 35 | — | 10 | — | — | — | 30 | — | — | — |
| G17 | 25 | 35 | — | 10 | — | — | — | — | 30 | — | — |
| G18 | 15 | 10 | — | 5 | — | — | — | — | — | 70 | — |
| G19* | 10 | 5 | — | 5 | — | — | — | — | — | 80 | — |
| G20 | 25 | 30 | — | 10 | — | — | 20 | — | — | 15 | — |
| G21 | 25 | 30 | — | 10 | — | — | — | 20 | — | 15 | — |
| G22 | 25 | 30 | — | 10 | — | — | — | — | 15 | 20 | — |
| G23 | 25 | 30 | — | 5 | — | — | — | 10 | 10 | 20 | — |
| G24 | 24 | 30 | — | 10 | — | — | — | — | — | 35 | 1 |
| G25 | 10 | 20 | — | 10 | — | — | — | — | — | 30 | 30 |
| G26* | 5 | 20 | — | 10 | — | — | — | — | — | 15 | 50 |

What is claimed is:

1. A dielectric ceramic composition for radiofrequency applications comprising a crystalline primary component having a perovskite crystal structure and an auxiliary component, wherein the crystalline primary component is represented by the formula:

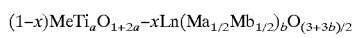

$$(1-x)\text{MeTi}_a\text{O}_{1+2a}-x\text{Ln}(\text{Ma}_{1/2}\text{Mb}_{1/2})_b\text{O}_{(3+3b)/2}$$

in which Me is at least one of Ca and Sr; Ln is a rare earth element; Ma is at least one of Mg and Zn; Mb is at least one of Sn and Zr; x represents a mole fraction of Ln(Ma$_{1/2}$Mb$_{1/2}$)$_b$O$_{(3+3b)/2}$; and and wherein a, b, and x are, respectively, $$0.95 \leq a \leq 1.05,$$

$$0.9 \leq b \leq 1.05,$$

and $$0.3 \leq x \leq 0.5,$$

and wherein the auxiliary component comprises B and Si.

2. The dielectric ceramic composition according to claim 1, wherein the auxiliary component is a glass comprising B and Si.

3. The dielectric ceramic composition according to claim 2, wherein the auxiliary component comprises:

about 10 to 60 percent by weight of SiO$_2$;

about 5 to 40 percent by weight of B$_2$O$_3$;

0 to about 30 percent by weight of Al$_2$O$_3$;

about 20 to 70 percent by weight of EO; and 0 to about 15 percent by weight of A$_2$O, wherein E is at least one of Zn or an alkaline earth metal element, and A is at least one alkali metal element.

4. The dielectric ceramic composition according to claim 3, wherein the content of the auxiliary component is in the range of about 1 to 40 parts by weight per 100 parts by weight of the primary component.

5. The dielectric ceramic composition according to claim 4, further comprising an additive which is at least one of CuO and TiO$_2$, in an amount with respect to 100 parts by weight of the primary component of up to about 5 parts by weight of CuO and up to about 15 parts by weight of TiO$_2$.

6. The dielectric ceramic composition according to claim 5, wherein the rare earth element is at least one member selected from the group consisting of Y, La, Pr, Nd and Sm.

7. The dielectric ceramic composition according to claim 6, wherein Me is Ca and Ma is Mg.

8. A dielectric ceramic compact for radiofrequency applications comprising a sintered dielectric ceramic composition according to claim 7.

9. An electronic component comprising a ceramic element having at least one conductor disposed in the interior of the ceramic element, wherein the ceramic element is a sintered composite of a plurality of green ceramic sheets comprising a dielectric ceramic compact according to claim 8.

10. The electronic component according to claim 9, wherein the conductor comprises Ag or Cu.

11. The dielectric ceramic composition according to claim 1, further comprising an additive which is at least one of CuO and TiO$_2$, in an amount with respect to 100 parts by weight of the primary component of up to about 5 parts by weight of CuO and up to about 15 parts by weight of TiO$_2$.

12. The dielectric ceramic composition according to claim 1, wherein the rare earth element is at least one member selected from the group consisting of Y, La, Pr, Nd and Sm.

13. The dielectric ceramic composition according to claim 1, wherein Me is Ca and Ma is Mg.

14. The dielectric ceramic composition according to claim 1, wherein the auxiliary component comprises:

about 10 to 60 percent by weight of SiO$_2$;

about 5 to 40 percent by weight of B$_2$O$_3$;

0 to about 30 percent by weight of $Al_2O_3$;

about 20 to 70 percent by weight of EO; and 0 to about 15 percent by weight of $A_2O$, wherein E is at least one of Zn or an alkaline earth metal element, and A is at least one alkali metal element.

15. A dielectric ceramic compact for radiofrequency applications comprising a sintered dielectric ceramic composition according to claim 1.

16. An electronic component comprising a ceramic element having at least one conductor disposed in the interior of the ceramic element, wherein the ceramic element comprises a dielectric ceramic compact according to claim 15.

17. An electronic component according to claim 16, wherein the ceramic element is a sintered composite of a plurality of green ceramic sheets comprising said dielectric ceramic compact.

18. The electronic component according to claim 17, wherein the conductor is a fired pattern of a conductive paste disposed on a sintered green ceramic sheet.

19. The electronic component according to claim 18, wherein the conductor comprises Ag or Cu.

20. The electronic component according to claim 15, wherein the electronic component is a filter.

* * * * *